March 18, 1958 W. A. ANDERSON 2,827,230
TEN KEY EARLY ENTRY AND INDEX RETENTION MECHANISM
Filed Dec. 29, 1954 4 Sheets--Sheet 2
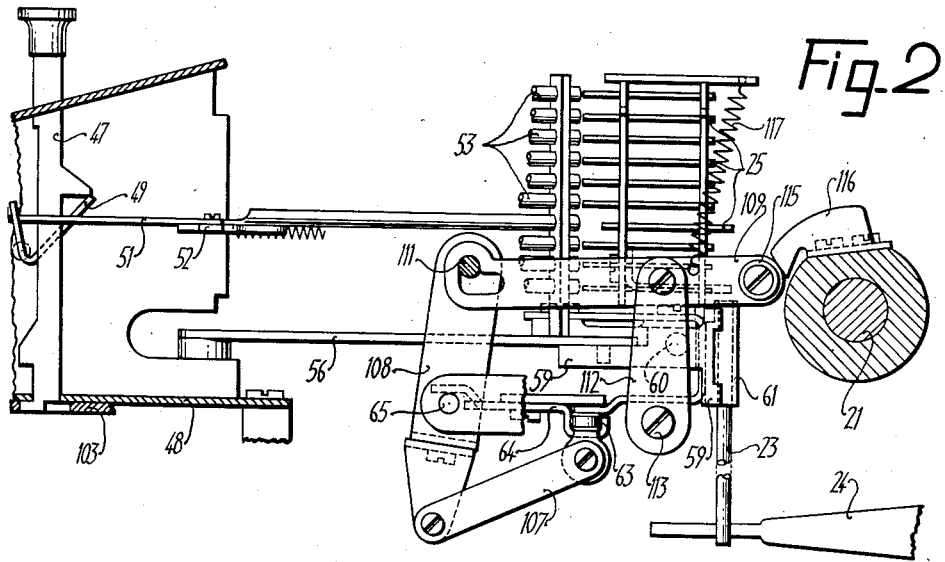
INVENTOR.
WALTER A. ANDERSON
BY
Jesse A. Holton
ATTORNEY March 18, 1958 W. A. ANDERSON 2,827,230
TEN KEY EARLY ENTRY AND INDEX RETENTION MECHANISM
Filed Dec. 29, 1954 4 Sheets-Sheet 3
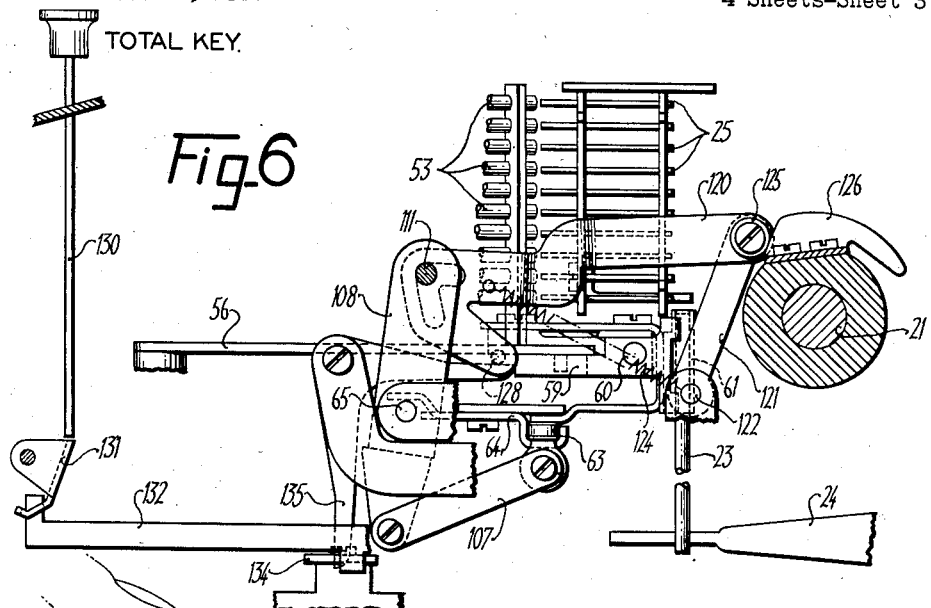
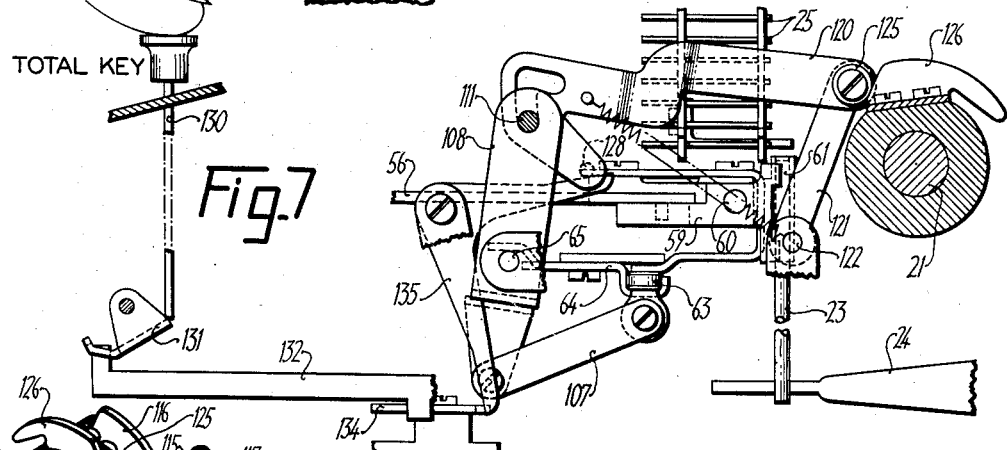
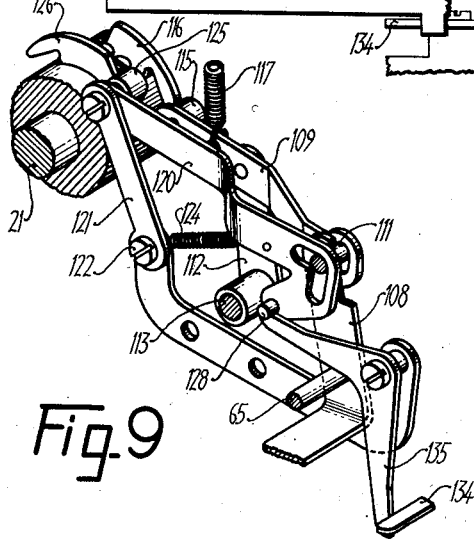
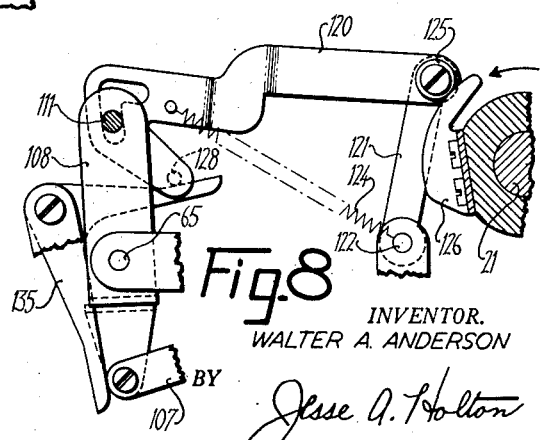
INVENTOR.
WALTER A. ANDERSON
BY
Jesse A. Holton
ATTORNEY

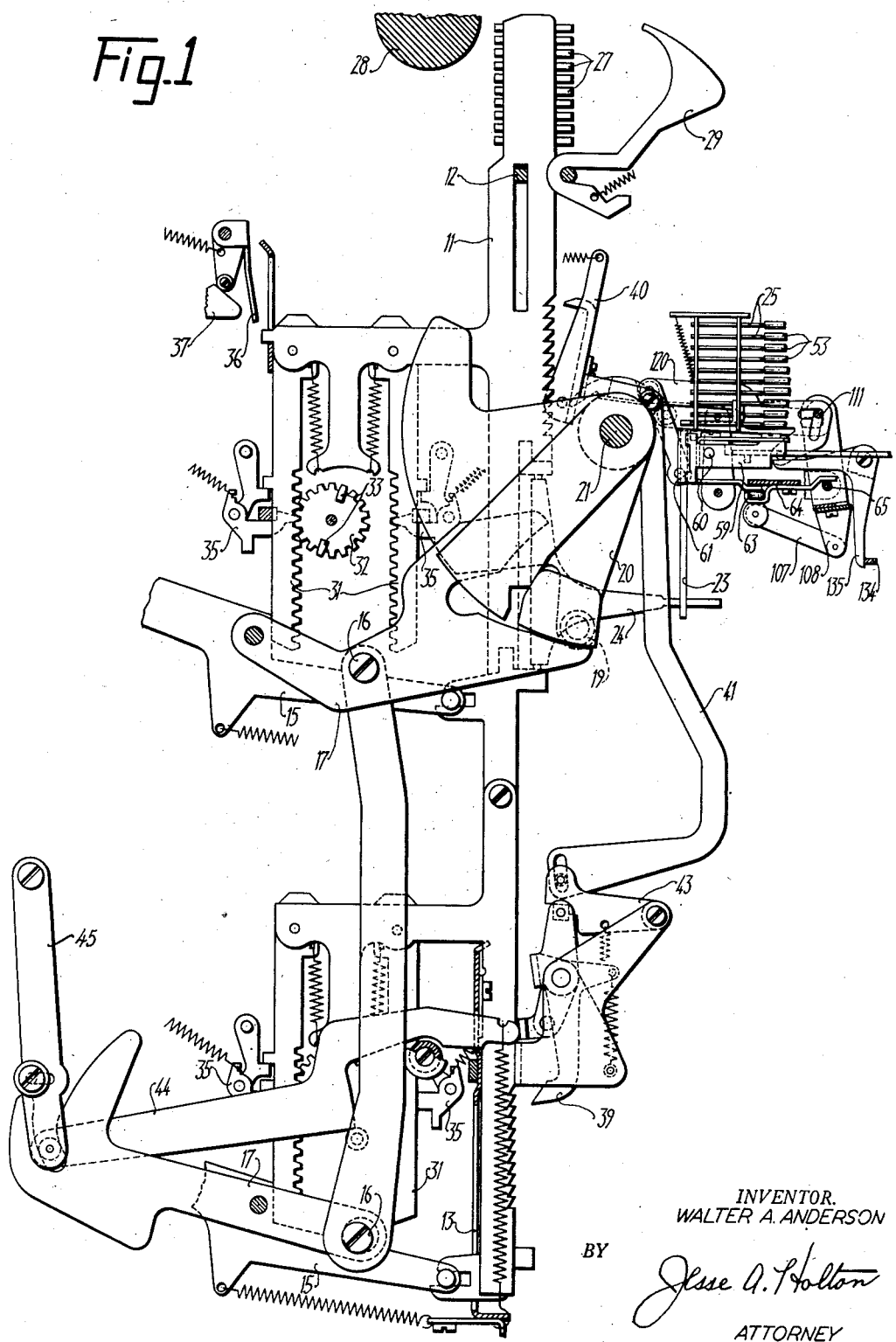

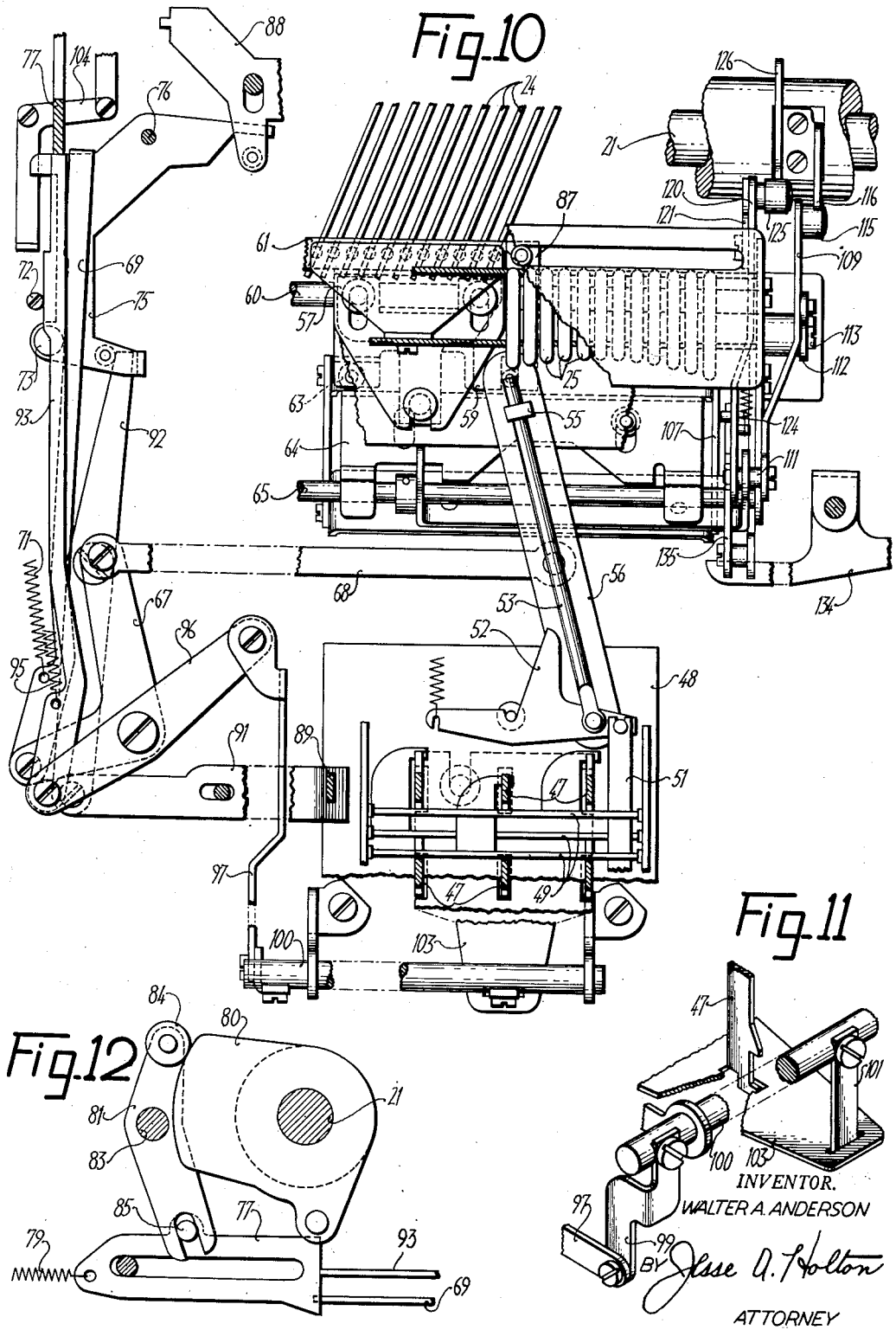

United States Patent Office 2,827,230
Patented Mar. 18, 1958

2,827,230

TEN KEY EARLY ENTRY AND INDEX RETENTION MECHANISM

Walter A. Anderson, Trumbull, Conn., assignor to Underwood Corporation, New York, N. Y., a corporation of Delaware Application December 29, 1954, Serial No. 478,367

3 Claims. (Cl. 235—60)

This invention relates generally to item entering mechanisms for accounting machines and more particularly to a mechanism enabling either an early entry of a new item or the retention of a set up item during total taking operations.

Ten key accounting machines have previously been provided with a mechanism to retain an indexed item during total taking cycles whereby a repeat entry may be made after a total is printed. Also well known are ten key accounting machines with a mechanism which permits a new item to be set up in the indexing mechanism while the machine is entering a previously set item. Applicant has determined that the same mechanism may be used with two different control mechanisms to provide both of these features in the same machine with an added advantage in that under some circumstances a complete new entry may be indexed during total cycles as compared to a maximum entry of one or two digits during completion of a cycle which was the practical limit on early setting of a new amount in previous machines due to time limitations. In the present machine, an operator may index a subsequent item during an entire total cycle and a part of the prior cycle giving time for substantially a complete entry to be made with the result that the machine may be continuously cycled for a number of different operations thereby saving the operator's time and enabling a substantially greater work output.

It is then an object of this invention to develop a ten key accounting machine in which an item may be indexed in the stop section of the machine prior to the completion of the entry of a previous item, or during the printing of a total or alternatively, in which an item may be retained in the stop section during total taking operations.

It is also an object of this invention to provide a ten key accounting machine in which a mechanism normally operative to permit the indexing of a new amount prior to completion of a machine cycle may be additionally controlled to retain a set up item during total taking cycles.

Still another object is to provide such mechanism by utilization of a substantial part of devices already in the accounting machine for retaining a set-up item during total taking cycles.

A further object is to device a device for the functions above set out which is inexpensive to manufacture and service and yet is simple and reliable in operation.

Other objects will be in part obvious and in part specifically set out in the following description of and accompanying drawings showing a preferred embodiment of the invention.

In the accompanying drawings:

Figure 1 is a left side view showing a part of the indexing and registering mechanisms, Figure 2 is a right side view of the indexing and retaining mechanism in normal position, Figure 3 is a view of a part of Figure 2 showing the mechanism during the first half cycle, Figure 4 is a view similar to Figure 3 showing the parts in the mid cycle position, Figure 5 is a view of a portion of Figure 2 showing the parts in the positions assumed during the second half cycle, Figure 6 is a view similar to Figure 2 but showing the mechanism to retain an indexed item during totals, Figure 7 is a view similar to Figure 6 but showing the parts as positioned by operation of a total key, Figure 8 is a view of a portion of Figure 6 with the parts positioned in a total cycle, Figure 9 is a perspective view of the item retaining and early indexing mechanisms, Figure 10 is a plan view of the structure featuring this invention, Figure 11 is a detail in perspective of the indexing key lock mechanism, and Figure 12 shows the operating mechanism for the key lock and item restoring devices.

General description

The invention is disclosed herein as incorporated in a well known "Sundstrand" accounting machine as described in U. S. Patent No. 2,194,270, issued March 19, 1940, to O. J. Sundstrand; Patent No. 2,536,524, issued January 2, 1951, to W. A. Anderson; and Patent No. 2,655,312, issued October 13, 1953, to W. A. Anderson. The latter of these patents shows an item retaining mechanism to enable retention of an indexed amount in the nest of settable pins during a total cycle. It is well known that an early indexing of a new amount may be accomplished by transferring control of the adding racks to a set of detents, releasing them from the set pins at about a mid-cycle position, and immediately restoring the pin carriage and any set index pins to normal position to permit setting up a new amount while the machine is finishing the adding cycle.

In the present embodiment the both functions are combined in that the mechanism for disconnecting the type bars from control by the settable index pins is operated at the start of a total taking cycle to enable the register to limit type bar movement or at the middle of an item entry cycle. As soon as the type bars are released from control by the pins, the machine is, in the entry cycle or the cycle preceding the total cycle, readied for a new item entry from the keys.

More specifically, Figure 1 is a section through an accounting machine substantially the same as in Patents 2,194,220 and 2,536,524, supra, with a portion of the mechanism of my Patent 2,655,312. A plurality of type bars 11, only one bar being shown herein, are supported for vertical sliding movement on a fixed bar 12 and in a slotted frame 13. Type bars 11 are yieldingly driven upwardly by individual spring pressed arms 15 which follow bars 16 mounted between cam arms 17. The upper cam arms 17 are controlled in their movements by rollers 19 on arms 20 secured to a main shaft 21 which is oscillated clockwise ninety degrees and returned to the Figure 1 position during a machine cycle. The type bars 11 are, during an item entering cycle, moved upwardly by arms 15 until a tail pin 23 slidable on an arm 24 pivoted to type bar 11 strikes a set pin 25 of a nest of pins to arrest type bar 11 and position a type 27 in position to be driven against a platen 28 by a hammer 29. Secured to extensions on the back of type bar 11 are two pairs of racks 31 which are engageable by register wheels 32 to enter the indexed values into wheels 32 or which may be engaged by register wheels 32 at the beginning of a total cycle to limit upward movement of bars 11 by the engagement of transfer lugs 33 on the wheels with transfer pawls 35 in the well known total taking operation. A sector lock 36 operable by a carriage controlled cam 37 is provided to engage the rear extensions of type bars 11 during the blank cycles required prior to a total cycle to prevent movement of type bars 11 above the "0" printing position as is more fully set forth in the above Patent 2,655,312.

A plurality of spring urged detents 39 are, during the return half cycle of main shaft 21, engaged in notches in the lower ends of type bars 11 under control of the type bar aligner 40 which operates through a link 41 to release a latch 43 holding all detents 39 away from type bars 11. The detents 39 are disengaged from bars 11 near the end of a machine cycle by an arm 44 connected to a depending arm 45 and actuated by the rear end of lower cam arm 17 as more fully described in my Patent 2,655,312. The detents 39 will, when engaged, permit only a downward movement of type bars 11 by arms 15 during restoration and will thus prevent any upward movement of the bars to change the setting of the bars 11 from pins 25.

Amount indexing mechanism

The amount indexing mechanism by which the type bars 11 are controlled in their upward movement is substantially similar to that described in the above patents. Referring to Figure 10, a plurality of digit keys 47, only the stems being shown herein, are mounted for slidable movement in a keyboard frame 48. Each key 47 when depressed operates an associated bell crank 49 to push rearwardly a link 51 connected between the bell crank 49 and a lever 52 to rock lever 52 counterclockwise. A push rod 53 is connected to each lever 52 and is supported at its rear end in a post 55 mounted on a swinging arm 56 which aligns the rear ends of the push rods 53 with one vertical line of pins 25 so that operation of a key 47 will push one of the pins 25 rearwardly into a blocking position above a tail pin 23. Swinging arm 56 is spring urged clockwise in Figure 10 and is held by an escapement mechanism, not shown, controlled by levers 52 so that as a pin 25 is set, the arm 56 and push rods 53 will be moved into alignment with the next rightward line of pins 25.

The tail pins 23 are moved seriatim from under a zero stop plate 57 into alignment with the set pins 25 by arm 56 which engages in a slidable guide 59 movable on a shaft 60, see also Figure 1. Movable with guide 59 and slidable rearwardly thereon from the Figure 10 position is a tail pin guide 61 having the upper ends of pins 23 slidable therein and having rollers 63 engaging in a channel in a member 64 slidable rearwardly from the Figure 10 position on a shaft 65 to move the tail pins 23 rearwardly away from pins 25.

The swinging arm 56, tail pins 23, guide 61 and arm 24 are returned leftwardly to their home, Figure 10, position early in the second half cycle of shaft 21 by a bell crank 67 connected to arm 56 by a link 68. An arm 69 is pivoted on bell crank 67 and is urged counterclockwise by a spring 71 toward a stop pin 72 but is normally held in the Figure 10 position by a roller 73 on a lever 75. Lever 75 is pivoted on a stationary stud 76 and is held in its normal position by a cyclically operated slide 77, see Figure 12. Slide 77 is urged rearwardly by a spring 79 and is controlled in its movement by a cam 80 on shaft 21 through a lever 81 pivoted on a fixed pivot 83 and having a roller 84 engaging cam 80 and a slot embracing a stud 85 on slide 77. During a cycle of shaft 21, slide 77 is first moved rearwardly away from lever 75 freeing arm 69 which will then move against the right side of slide 77 until slide 77 is far enough to the rear to allow arm 69 to move clockwise until lever 75 rests against stop 72 and arm 69 is in front of slide 77. On the return of slide 77, arm 69 is moved forwardly to restore swinging arm 56 and tail pins 23 to their home, Figure 10, position. Near the end of the forward motion of slide 77, it contacts lever 75 to again swing arm 69 clockwise from in front of slide 77 in preparation for rearward movement under control of keys 47. Any pins 25 which have been projected rearwardly are reset during the return movement of swinging arm 56 by a post 87 having an inclined edge and secured to slide 59 to the rear of pins 25.

When it is desired to retain an item set up in pins 25 for a repeat entry, the restoring arm 69 is held in its clockwise position during a machine cycle. This may be done automatically under control of the machine carriage through an arm 88 moved rearwardly by the carriage in selected columnar positions or manually by operation of a repeat key 89 which holds leftwardly a cam slide 91 to rock an arm 92 clockwise. In either condition arm 69 cannot move in front of slide 77 and there will be no restoration of arm 56.

The keys 47 are locked during the restoration of swinging arm 56 by a second arm 93 actuated by slide 77. This arm 93 is pulled counterclockwise against stop 72 and rearwardly to follow slide 77 by a spring 95 and is connected at its forward end to one end of a lever 96. A link 97 connects the other end of lever 96 to an arm 99 of a shaft 100 which shaft has another arm 101 engaging in a slot in a keylock plate 103. As more clearly shown in Figure 11, when shaft 100 is rocked by link 97, lock plate 103 is moved forwardly to lie under shoulders on keys 47 and thus prevent depression of a key 47. A carriage controlled lever 104, Figure 10, may be operated to engage a shoulder on arm 93 to prevent rearward movement of arm 93 when slide 77 is operated and thus prevent locking of keys 47 during a machine cycle.

Early indexing of a new amount

A new amount may be indexed in pins 25 as soon as the swinging arm 56 is restored to its home position and the key lock 103 is released which operations are completed early in the second half cycle of shaft 21. Such reindexing will be free of interference by any previously raised tail pins 23 if the pins are moved rearwardly away from pins 25. The means for so moving the tail pins 23 is best shown in Figures 2, 3, 4 and 5. Figure 2 shows the parts in their normal positions and it will be seen that tail pins 23 are in vertical alignment with the set pins 25 and with the rollers 63 of the tail pin guide 59 in their forward position. The channel slide 64 in which the rollers 63 are laterally movable is also in its forward position. A link 107 is connected between channel slide 64 and a lever 108 pivoted on shaft 65 to move the slide 64 and thereby shift tail pins 23 to their rearward ineffective positions. Lever 108 is rocked counterclockwise during the second half cycle of main shaft 21 by a pivoted lever 109 having an L-shaped slot in its forward end engaging a pin 111 fixed in lever 108. Lever 109 is pivotally mounted on an arm 112 freely rotatable on a fixed pivot 113 and carries on its rearward end a roller 115 engaging a cam 116 on main shaft 21. A spring 117 between the rear arm of lever 109 and a stationary part of the machine frame urges lever 109 counterclockwise and rearwardly about pivot 113.

At the beginning of a cycle of main shaft 21, counterclockwise in Figures 2 to 5 inclusive, the abrupt rise of cam 116 engages roller 115 to rock lever 109 clockwise against the tension of spring 117 until the bottom of the slot of lever 109 engages pin 111. Further rotation of cam 116 will then move lever 109 and arm 112 forwardly about pivot 113 to the Figure 3 position but as pin 111 is now in the horizontal portion of the slot of lever 109, this will have no effect on lever 108. The parts remain in this position until the middle of the cycle of shaft 21 at which point cam 116 will move away from roller 115 and spring 117 will restore the lever 109 and arm 112 to their normal positions as shown now in Figure 4. During this first half cycle, lever 108 is not moved and therefore tail pins 23 remain in vertical alignment with such pins 25 as have been set and as previously described will be moved upwardly into engagement with the stops to position type bars 11 for printing.

At the very beginning of the return of shaft 21, the type aligner 40, Figure 1, is released to engage the type bars 11 and through link 41 will release lock 36 to enable detents 39 to engage in the notches in type bars 11 and prevent any further upward movement of bars 11. Pins 25 are no longer needed to prevent such type bar movement and the tail pins 23 may then be moved away from pins 25 as shown in Figure 5. As soon as detents 39 are engaged with type bars 11, cam 116 reengages roller 115 but as pin 111 is at this time at the top of the slot in lever 109, the lever 109 cannot move counterclockwise and moves forwardly only. In this movement, pin 111 is confined in the narrow portion of the slot and must move with lever 109 thus forcing lever 108 counterclockwise and, through link 107, channel slide 64 and tail pin guide 59, moving the tail pins 23 rearwardly. The swinging arm 56 and tail pin guide are immediately restored leftward as set forth above and as soon as the keys 47 are unlocked, the operator may start indexing a new amount. The tail pins 23 are retained in their rearward position until the operation of main shaft 21 has restored levers 17, Figure 1, and the pins 23 to their lower positions where there will be no interference with pins 25. Just prior to the full return of shaft 21 to its home position, cam 116 moves above roller 115 and spring 117 then restores the levers 109, 108, guide 59 and tail pins 23 to their home positions in readiness for a new machine cycle.

*Item retention during totals*

It is sometimes desirable in accounting work to print an item, to then take a total or a subtotal of the accumulated items and to thereafter repeat print the item. In my above noted Patent No. 2,655,312, I have shown one mechanism for enabling this result. The present machine incorporates an improved mechanism for this result by relieving the total key of the load of shifting the tail pins 23 rearwardly. Referring to Figures 6 to 9, a link 120 is connected at its rear end to an arm 121 pivoted on the machine frame at 122 and is urged counterclockwise and rearwardly by a spring 124 to hold a roller 125 on its rear end against a cam 126 on main shaft 21. The forward end of link 120 is formed with an inverted L slot embracing pin 111 in lever 108 and is also extended downwardly with a pin 128 in its lower end. In item entering cycles, the pin 111 is in the upper horizontal part of the slot of link 120 and the cyclic motion of link 120 by cam 126 during the cycles of shaft 21 has no effect on lever 108.

When the total key 130 of the keyboard (or the subtotal key, not shown) is depressed, it lifts the forward end of link 120 through a bell crank 131, a slide 132 having a lug thereon, a lever 134 pivoted on the frame and resting in front of the lug of slide 132 and a lever 135 resting under pin 128 of link 120. In this upward position of the forward end of link 120, the vertical portion of the slot is engaging pin 111 as shown in Figure 7 and lever 108 will then be driven by link 120 from cam 126 during a machine cycle, as shown in Figure 8. Cam 126 is sufficiently long that it does not leave roller 125 at the mid cycle position and hence link 120 and lever 108 will be actuated at the start of a total taking cycle and will remain actuated until the end of the cycle. As actuation of lever 108 will move the tail pins 23 from alignment with any set stops 25, the type bars are free during this cycle to rise until they are arrested by the register wheels 32, Figure 1, as in the usual total operation. The pins 25 may therefore remain set during such cycle in readiness to again control the type bars 11 during an ensuing item entering cycle. It will be understood that the repeat lever 75, Figure 10, will be blocked either manually from key 89 or automatically from the carriage repeat arm 88 to prevent restoration of swinging arm 56 during such total cycle.

*Item entry during totals*

When a set up item is not to be retained for use after a total cycle, it is possible in the disclosed machine to completely preset in the total cycle a succeeding item for entry after the total is taken. In this type of machine, a blank, non-entry, cycle precedes a total cycle and as above set out, the keys 47 are released by lock plate 103 shortly after the middle of this cycle. An operator may then start indexing a new amount as described above since such a blank cycle is the same as an item entering cycle except that the sector lock plate 36 is set by the carriage to prevent movement of type bars 11 past their "0" positions. During the total cycle, tail pins 23 are moved away from pins 25 during the entire cycle and there is nothing to prevent continuation of the item entering. The restoring mechanism will be automatically set for a repeat operation by a carriage operation of the repeat arm 88, Figure 10, so that the swinging arm 56 will not be restored during this total cycle. The keys 47 are kept free for operation due to the engagement of the carriage controlled arm 104 with the shoulder on lock slide arm 93 during such total cycle and thus movement of lock slide 103 to locking position is prevented. Such blank and total cycles are generally automatically controlled and the operator is free during most of this period to preindex the next entry.

The above description is of a preferred embodiment only of my invention and is not to be taken in a limiting sense as substantial variations in structure are possible with departure from the invention as set forth in the following claims.

What is claimed is:

1. An accounting machine of the class described having machine cycling means, a plurality of rack members, a register engageable with said rack members to receive entries therefrom and to control said rack members in total operations, a plurality of digit keys, a field of settable stop members settable seriatim by said digit keys, means connected to said rack members and shiftable thereon, a slidable member guiding said rack member connected means and slidable with said connected means across said field of stops under control of said digit keys, means to move said slidable member and the connected means guided thereby to an ineffective position with respect to said stop members, said means comprising a channeled slide to shift said slidable member in any of its positions, a lever connected to said slide, a pair of cyclically operated cams having forward and return motions, a pair of members engageable with said lever, each member having an effective and an ineffective position with respect to said lever and being driven by an associated one of said cams, the first of said members being moved by its cam ineffectively during the forward motion of its cam and effectively during the return motion of said cam, said cam initially moving the member to its ineffective position, and the second of said members being moved by its cam for substantially the duration of its forward and return motions, said second member being normally in an ineffective position, and means operable in total taking cycles to move said second member to its effective position with respect to said lever prior to movement of said second member by its cam.

2. An accounting machine of the class described having a field of manually indexable stops arranged in denominational rows, a plurality of actuator rack bars, a register engageable with said rack bars in item entering and total taking operations, an engaging member connected to each said rack bar, a slide mounting said engaging members for group movement across said rows of stops and for individual movement parallel to said rows of stops, a movable support on which slide is shiftable for group movement of said engaging members, a pair of cyclically operated cams, a linkage from each cam to said movable support to normally hold said support with said engaging members in the plane of said field of stops, one of said linkages being effective to shift said movable support and move said engaging members out of the plane of the indexed ones of said indexable stops after said actuator rack bars have been positioned by said stops, said second linkage being normally ineffective and manipulative means to render said second linkage effective to move said engaging members out of alignment with said stops during substantially the entire movement of said cams.

3. An accounting machine of the class described having a field of stop pins arranged in denominational rows and each stop pin being manually indexable to an effective position, a slide movable across said denominational rows of stop pins, a plurality of engaging members slidable in said slide in the direction of said rows of stop pins and normally held by said slide in position to engage a set stop pin and be arrested thereby during movement in one direction, an actuator rack bar connected to each engaging member, a register engageable with said rack bars to receive item entries therefrom or to limit movement of said actuator rack bars in total taking operations, means to shift said slide and said engaging members slidable therein to a position wherein said engaging members will not engage a set stop pin, cycling means, a normally effective cyclically operated device to shift said slide to said position at substantially the mid-point of an item entering operation, a manipulative total member and a second cyclically operated device rendered effective by manipulation of said total member to shift said slide during substantially an entire machine cycle to determine control by said register only over movement of said actuator rack bars during total taking cycles.

References Cited in the file of this patent

UNITED STATES PATENTS

| | | |
|---|---|---|
| 1,178,073 | Hopkins | Apr. 4, 1916 |
| 1,874,805 | Robertson | Aug. 30, 1932 |
| 2,303,692 | Hellgren | Dec. 1, 1942 |
| 2,581,624 | Boyden et al. | Jan. 8, 1952 |
| 2,630,967 | Swanson et al. | Mar. 10, 1953 |
| 2,708,550 | Maier | May 17, 1955 |

FOREIGN PATENTS

| | | |
|---|---|---|
| 716,656 | Great Britain | Apr. 28, 1952 |
| 118,240 | Sweden | Dec. 22, 1941 |